(12) United States Patent
Nakagaki (10) Patent No.: US 11,215,254 B2
(45) Date of Patent: Jan. 4, 2022

(54) VIBRATION CONTROL BUSH

(71) Applicant: Toyo Tire Corporation, Itami (JP)

(72) Inventor: Takahiro Nakagaki, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 241 days.

(21) Appl. No.: 16/659,849

(22) Filed: Oct. 22, 2019

(65) Prior Publication Data

US 2020/0132151 A1 Apr. 30, 2020

(30) Foreign Application Priority Data

Oct. 26, 2018 (JP) .............................. JP2018-201436

(51) Int. Cl.
| | |
|---|---|
| *F16F 15/08* | (2006.01) |
| *F16F 1/37* | (2006.01) |
| *F16F 1/373* | (2006.01) |
| *F16F 1/393* | (2006.01) |
| *F16F 1/387* | (2006.01) |

(52) U.S. Cl.
CPC ............ *F16F 1/3732* (2013.01); *F16F 1/393* (2013.01); *F16F 15/08* (2013.01); *B60G 2204/41* (2013.01); *F16F 1/3876* (2013.01)

(58) Field of Classification Search
CPC .......... F16F 1/3732; F16F 1/393; F16F 15/08; F16F 1/3876; B60G 3/06; B60G 2204/41
See application file for complete search history.

(56) References Cited

U.S. PATENT DOCUMENTS

| | | | | |
|---|---|---|---|---|
| 3,392,971 A | * | 7/1968 | Herbenar ................. | B60G 7/02 267/269 |
| 5,058,867 A | * | 10/1991 | Hadano ............... | F16C 11/0614 267/141.3 |
| 5,887,859 A | * | 3/1999 | Hadano ..................... | F16F 1/38 267/141.1 |
| 5,938,220 A | * | 8/1999 | Torneld ..................... | F16F 1/38 280/124.145 |
| 6,224,046 B1 | * | 5/2001 | Miyamoto ............. | B60G 3/202 267/140.12 |
| 8,505,889 B2 | * | 8/2013 | Suzuki ..................... | B60G 3/20 267/293 |

(Continued)

FOREIGN PATENT DOCUMENTS

JP 2018-071664 A 5/2018

*Primary Examiner* — Robert A. Siconolfi
*Assistant Examiner* — James K Hsiao
(74) *Attorney, Agent, or Firm* — Westerman, Hattori, Daniels & Adrian, LLP (57) ABSTRACT

To provide a vibration control bush that ensures improved durability of a rubber elastic body. An inner pipe film portion of the vibration control has an inclined surface whose inclination angle θ with respect to an axis O direction is set to one degree or more and less than three degrees, and the inner pipe film portion has an end portion in the axis O direction whose thickness dimension is set to a quarter or less of a dimension in an axis O perpendicular direction from an outer peripheral surface of an inner pipe to an apex of the protruding portion. This ensures reducing a rubber elastic body to deform so as to bend (close contact) between the inner pipe film portion and the outer pipe film portion when a load in a wrenching direction is input. Accordingly, a durability of the rubber elastic body can be improved.

6 Claims, 3 Drawing Sheets

(56) References Cited

U.S. PATENT DOCUMENTS

| | | | | |
|---|---|---|---|---|
| 10,792,968 B2* | 10/2020 | Sung | ......................... | F16F 1/387 |
| 2002/0060385 A1* | 5/2002 | Mayerbock | ............. | F16F 13/14 |
| | | | | 267/293 |
| 2002/0079629 A1* | 6/2002 | Tadano | ................. | F16F 1/3863 |
| | | | | 267/140.11 |
| 2003/0020223 A1* | 1/2003 | Kameda | ................. | B21K 21/12 |
| | | | | 267/293 |
| 2005/0153781 A1* | 7/2005 | Buhl | ..................... | F16F 1/3842 |
| | | | | 464/89 |
| 2008/0174082 A1* | 7/2008 | Bunker | ................. | B60G 7/001 |
| | | | | 280/124.109 |
| 2008/0284076 A1* | 11/2008 | Miyahara | ................ | F16F 1/387 |
| | | | | 267/140.13 |
| 2009/0289399 A1* | 11/2009 | Suzuki | ................... | B60G 7/005 |
| | | | | 267/140.12 |
| 2015/0014906 A1* | 1/2015 | Shinobu | ................. | F16F 15/08 |
| | | | | 267/141.2 |
| 2015/0247543 A1* | 9/2015 | Kuki | ...................... | F16F 1/3842 |
| | | | | 267/141.2 |
| 2015/0273967 A1* | 10/2015 | Grim | ........................ | B60G 7/02 |
| | | | | 267/292 |
| 2015/0300436 A1* | 10/2015 | Kojima | ................. | F16F 1/3876 |
| | | | | 267/141.2 |
| 2017/0097061 A1* | 4/2017 | Rawlings | ............. | F16F 1/3828 |
| 2018/0326804 A1* | 11/2018 | Sung | ..................... | F16F 1/3835 |
| 2019/0226543 A1 | 7/2019 | Niwa | | |

* cited by examiner

VIBRATION CONTROL BUSH

TECHNICAL FIELD

The present invention relates to a vibration control bush, and especially relates to a vibration control bush that ensures improved durability of a rubber elastic body while reducing a product cost.

BACKGROUND ART

A vibration control bush is used at a part connecting a vehicle body and an arm, for example, a suspension mechanism of an automobile. The vibration control bush includes an inner pipe that has a spherical protruding portion projecting outward in an axis-perpendicular direction at the center in an axial direction, an outer pipe in a shape of a pipe arranged outward in the axis-perpendicular direction of the inner pipe, and a rubber elastic body that joins an inner peripheral surface of the outer pipe and an outer peripheral surface of the inner pipe, in some cases.

For example, Patent Literature 1 discloses a vibration control bush in which an inner diameter of an outer pipe (tubular member) gradually decreases as approaching a side of an end portion in an axial direction from a center in the axial direction in a region opposing a protruding portion in an axis-perpendicular direction, and the inner diameter of the outer pipe gradually increases as approaching the end portion side in the axial direction in a region on the end portion side in the axial direction with respect to the protruding portion.

With this vibration isolator, when a load in a wrenching direction (direction in which inner pipe and outer pipe intersect each other's axes) is input, a rubber elastic body can be shear-deformed in a curved region between the protruding portion and the outer pipe. Accordingly, a spring constant in the wrenching direction can be relatively decreased compared with when the load is input in the axis-perpendicular direction where the rubber elastic body compressively deforms between the inner pipe (protruding portion) and the outer pipe.

On the end portion side in the axial direction with respect to the region opposing the protruding portion, a facing interval between the inner peripheral surface of the outer pipe and the outer peripheral surface of the inner pipe can be increased as approaching outside in the axial direction, thereby ensuring increasing a dimension in the axis-perpendicular direction of a recessed portion of the rubber elastic body. Accordingly, a generation of a bulge or a wrinkle in the recessed portion of the rubber elastic body can be reduced when a load in the wrenching direction and the axis-perpendicular direction is input, thereby ensuring improved durability of the rubber elastic body.

CITATION LIST

Patent Literature

[Patent Literature 1] JP-A No. 2018-071664 (for example, paragraphs 0007 and 0031, and FIG. 1)

SUMMARY OF INVENTION

Technical Problem

However, since the above-described conventional technique has a configuration in which the inner diameter of the outer pipe varies in the axial direction, a shape of the outer pipe becomes complicated, thereby increasing a product cost of the vibration control bush. Meanwhile, for example, if the inner diameter of the outer pipe is made constant in the axial direction, there arises a problem that a stress is easily generated on a part of the recessed portion when a load in the wrenching direction is input. This problem will be described with reference to FIGS. 3A and 3B.

Figure 3A:
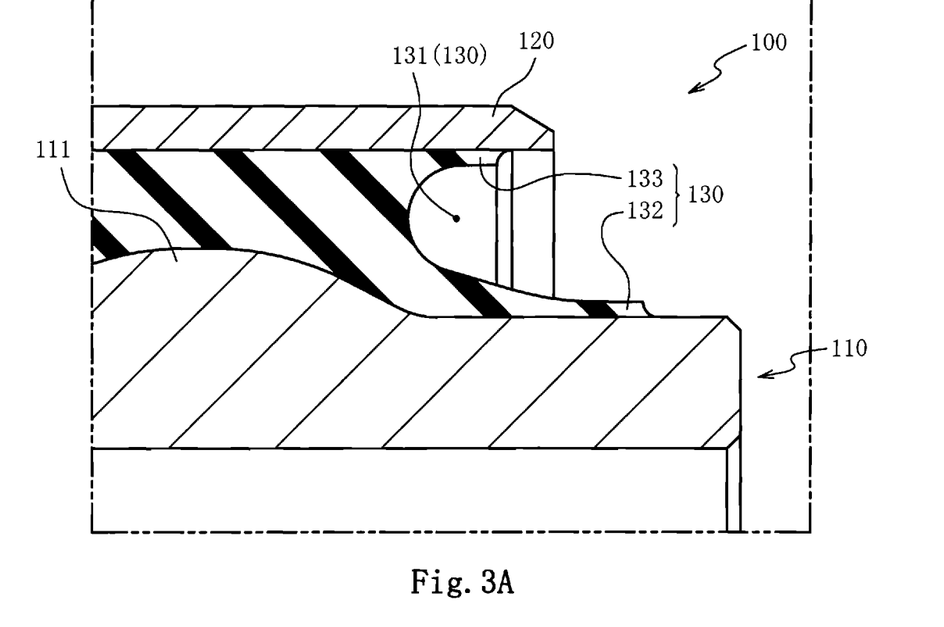
Figure 3B:
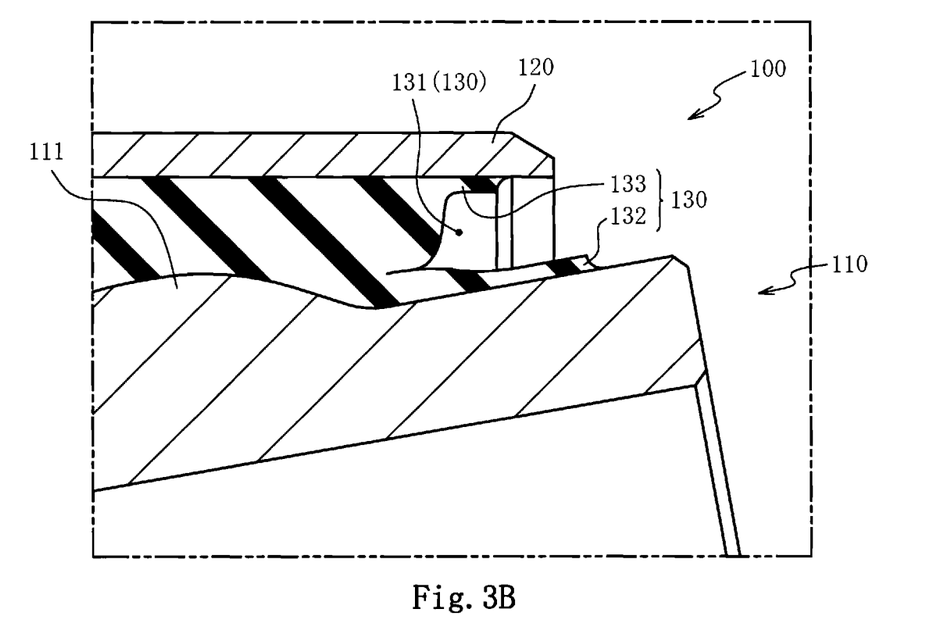
FIG. 3B is a partially enlarged cross-sectional view of the conventional vibration control bush illustrating a state where a load in a wrenching direction is input from a state of FIG. 3A.

FIG. 3A is a partially enlarged cross-sectional view of a conventional vibration control bush 100 that has an inner diameter of the outer pipe 120 constant in the axial direction, and FIG. 3B is a partially enlarged cross-sectional view of the conventional vibration control bush 100 when a load in a wrenching direction is input from a state of FIG. 3A. In FIGS. 3A and 3B, cross-sectional surfaces cut off on a plane having an axis of an inner pipe 110 (outer pipe 120) are illustrated.

As illustrated in FIG. 3A, the vibration control bush 100 includes the inner pipe 110, an outer pipe 120 arranged outward in an axis-perpendicular direction (vertical direction in FIG. 3A) of the inner pipe 110, and a rubber elastic body 130 that joins an inner peripheral surface of the outer pipe 120 and an outer peripheral surface of the inner pipe 110.

The inner pipe 110 has a spherical protruding portion 111 that protrudes outward in the axis-perpendicular direction from a central portion in its axial direction (lateral direction in FIG. 3A), and the outer pipe 120 has its inner diameter formed into a constant pipe shape along the axial direction. The rubber elastic body 130 has an end surface in the axial direction on which a recessed portion 131 recessed toward a center side in the axial direction is formed. Forming this recessed portion 131 causes an inner pipe film portion 132 (a part of the rubber elastic body 130) to coat the outer peripheral surface of the inner pipe 110 and an outer pipe film portion 133 (a part of the rubber elastic body 130) to coat the inner peripheral surface of the outer pipe 120.

The inner pipe film portion 132 has a thickness dimension formed to be a taper shape that gradually increases from its end portion in the axial direction to the center side in the axial direction. Forming the inner pipe film portion 132 into the taper shape forms the center side portion in the axial direction of the inner pipe film portion 132 relatively thick while ensuring a draft angle from a mold after vulcanization molding of the rubber elastic body 130.

As illustrated in FIG. 3B, when the load in the wrenching direction is input on the inner pipe 110 (outer pipe 120), a facing interval between the end portions in the axial direction of the inner pipe 110 and the outer pipe 120 decreases to compressively deform the rubber elastic body 130 positioned between these inner pipe 110 and outer pipe 120. Accordingly, compared with a case where the rubber elastic body shear-deforms within the curved region between the protruding portion and the outer pipe as in the above-described vibration control bush in Patent Literature 1, a flow of the rubber elastic body 130 (the inner pipe film portion 132 and the outer pipe film portion 133) to the center side in the axial direction is inhibited by the protruding portion 111 and the inner peripheral surface of the linear outer pipe 120.

Accordingly, the rubber elastic body 130 deforms so as to bend (close contact) between the center side portion in the axial direction of the inner pipe film portion 132 formed relatively thick and the center side portion in the axial direction of the outer pipe film portion 133, and thus, a stress easily concentrates on the deformed portion. Such a stress concentration easily causes a crack in the rubber elastic body 130 to lower durability of the rubber elastic body 130.

That is, in the conventional vibration control bush 100, making the inner diameter of the outer pipe 120 constant along the axial direction lowers the durability of the rubber elastic body 130 against the load in the wrenching direction. Accordingly, there has been a problem that it is difficult to obtain a reduced product cost of the vibration control bush 100 and ensured durability of the rubber elastic body 130 at the same time.

The present invention is made to solve the above-described problem, and it is an object of the present invention to provide a vibration control bush configured to improve durability of a rubber elastic body while reducing a product cost.

Solution to Problem

In order to achieve the object, according to the present invention, there is provided a vibration control bush that includes an inner pipe, a cylindrically-shaped outer pipe, a rubber elastic body, and a recessed portion. The inner pipe has a spherical protruding portion that protrudes outward in an axis-perpendicular direction and is formed continuously in a circumferential direction on a center side in an axial direction. The outer pipe is disposed in an outside in the axis-perpendicular direction of the inner pipe. The outer pipe has an inner diameter set constant along the axial direction. The rubber elastic body joins an inner peripheral surface of the outer pipe and an outer peripheral surface of the inner pipe. The recessed portion is recessed toward a center in the axial direction from an end surface in the axial direction of the rubber elastic body. The rubber elastic body includes an inner pipe film portion and an outer pipe film portion. The inner pipe film portion coats the outer peripheral surface of the inner pipe between the recessed portion and the inner pipe. The outer pipe film portion coats the inner peripheral surface of the outer pipe between the recessed portion and the outer pipe. The vibration control bush has a thickness dimension of the inner pipe film portion set to gradually increase from an end portion in the axial direction to the center side in the axial direction. The rubber elastic body has a linear inclined surface, a first curved surface, a linear straight line surface, and a second curved surface in a cross-sectional view cut off on a plane having an axis. The inclined surface configures an outer peripheral surface on an end portion side in the axial direction of the inner pipe film portion and inclining with respect to the axial direction. The first curved surface is installed consecutively with the inclined surface to configure an outer peripheral surface on a center side in the axial direction of the inner pipe film portion and is recessed toward the center side of the inner pipe in the axial direction. The straight line surface is installed consecutively with the first curved surface and running along the axis-perpendicular direction. The second curved surface is installed consecutively with the straight line surface to configure an inner peripheral surface on a center side in the axial direction of the outer pipe film portion and is recessed toward the center side of the inner peripheral surface of the outer pipe in the axial direction. The inner pipe film portion has an end portion in the axial direction whose thickness dimension is set to a quarter or less of a dimension in the axis-perpendicular direction from the outer peripheral surface of the inner pipe to an apex of the protruding portion. The inclined surface has an inclination angle with respect to the axial direction that is set to one degree or more and less than three degrees. A connection position of the inclined surface and the first curved surface is positioned on the center side in the axial direction with respect to the end portion in the axial direction of the outer pipe film portion.

Advantageous Effects of Invention

With the vibration control bush of a first aspect, the following effect is provided. The rubber elastic body configures the outer peripheral surface on the end portion side in the axial direction of the inner pipe film portion, and has the linear inclined surface that inclines with respect to the axial direction in the cross-sectional view cut off on the plane having the axis. The inclination angle with respect to the axial direction of the inclined surface is set to one degree or more and less than three degrees, and the thickness dimension of the end portion in the axial direction of the inner pipe film portion is set to a quarter or less of the dimension in the axis-perpendicular direction from the outer peripheral surface of the inner pipe to the apex of the protruding portion.

This ensures setting the inclination angle of the inclined surface as small as possible to the extent that can ensure the draft angle when the rubber elastic body (the inner pipe film portion) is vulcanization molded to form the inner pipe film portion to be thin walled from the end portion in the axial direction to the center side in the axial direction. The connection position (that is, the end portion on the center side in the axial direction of the inclined surface) of the inclined surface and the first curved surface is positioned on the center side in the axial direction with respect to the end portion in the axial direction of the outer pipe film portion, thereby ensuring disposing the inner pipe film portion formed to be thin walled on the center side in the axial direction with respect to the end portion in the axial direction of the outer pipe film portion. Accordingly, when the load in the wrenching direction is input in the inner pipe (the outer pipe), it is possible to reduce the rubber elastic body to deform so as to bend (close contact) between the inner pipe film portion and the outer pipe film portion.

The rubber elastic body includes the first curved surface installed consecutively with the inclined surface to configure the outer peripheral surface on the center side in the axial direction of the inner pipe film portion and recessed toward the center side of the inner pipe in the axial direction, the linear straight line surface installed consecutively with the first curved surface and running along the axis-perpendicular direction, and the second curved surface installed consecutively with the straight line surface to configure the inner peripheral surface on the center side in the axial direction of the outer pipe film portion and recessed toward the center side of the inner peripheral surface of the outer pipe in the axial direction, in the cross-sectional view cut off on the plane having the axis.

This ensures decreasing the dimension in the axis-perpendicular direction of the first curved surface and the second curved surface by the dimension of the straight line surface in the axis-perpendicular direction, thereby ensuring decreasing the curvature radii of the first curved surface and the second curved surface by that. Accordingly, the inner pipe film portion positioned between the first curved surface and the inner pipe and the outer pipe film portion positioned between the second curved surface and the outer pipe can be formed to be thin walled. Therefore, when the load in the wrenching direction is input on the inner pipe (the outer pipe), it is possible to further effectively reduce the rubber elastic body to deform so as to bend (close contact) between the inner pipe film portion and the outer pipe film portion.

That is, with the configuration of the first aspect, even when the inner diameter of the outer pipe is set constant in the axial direction, and the protruding portion protruding outward in the axis-perpendicular direction is formed in the center in the axial direction of the inner pipe, it is possible to reduce a stress to concentrate on a part of the rubber elastic body when the load in the wrenching direction is input. Accordingly, there lies an effect that ensures an improved durability of the rubber elastic body while reducing a product cost of the vibration control bush.

With the vibration control bush of a second aspect, in addition to the effect provided by the vibration control bush of the first aspect, the following effect is provided. A dimension in the axis-perpendicular direction from the outer peripheral surface of the inner pipe to a connection position of the first curved surface and the straight line surface is set to less than or equal to a dimension in the axis-perpendicular direction from the outer peripheral surface of the inner pipe to the apex of the protruding portion. This ensures disposing the first curved surface inside in the axis-perpendicular direction with respect to the apex of the protruding portion. That is, disposing the first curved surface with the curvature radius decreased by forming the straight line surface inside in the axis-perpendicular direction with respect to the apex of the protruding portion ensures forming the inner pipe film portion positioned between the first curved surface and the inner pipe to be thin walled in the region (a region where a flow of a rubber is easily inhibited by an existence of the protruding portion) inside in axis-perpendicular direction with respect to the apex of the protruding portion. Accordingly, when the load in the wrenching direction is input to the inner pipe (the outer pipe), it is possible to further effectively reduce the rubber elastic body to deform so as to bend (close contact) between the inner pipe film portion and the outer pipe film portion. Accordingly, there lies an effect that ensures the improved durability of the rubber elastic body.

With the vibration control bush of a third aspect, in addition to the effect provided by the vibration control bush of the second aspect, the following effect is provided. The dimension in the axis-perpendicular direction from the outer peripheral surface of the inner pipe to the connection position of the first curved surface and the straight line surface is set to a half or more of the dimension in the axis-perpendicular direction from the outer peripheral surface of the inner pipe to the apex of the protruding portion. This ensures inhibiting the dimension of the first curved surface in the axis-perpendicular direction from excessively decreasing, thereby ensuring inhibiting the curvature radius of the first curved surface from excessively decreasing. Accordingly, when the load in the wrenching direction is input on the inner pipe (the outer pipe), it is possible to reduce the stress to concentrate on the first curved surface, and therefore, there lies an effect that ensures the improved durability of the rubber elastic body.

With the vibration control bush of a fourth aspect, in addition to the effect provided by the vibration control bush of the second aspect, the following effect is provided. The first curved surface and the second curved surface are formed into respective arc shapes in the cross-sectional view cut off on the plane having the axis, and a dimension in the axis-perpendicular direction from the connection position of the first curved surface and the straight line surface to a connection position of the second curved surface and the straight line surface is set smaller than curvature radii of the first curved surface and the second curved surface. This ensures inhibiting the curvature radii of the first curved surface and the second curved surface from excessively decreasing. Accordingly, when the load in the wrenching direction is input on the inner pipe (the outer pipe), it is possible to reduce the stress to concentrate on the first curved surface and the second curved surface, and therefore, there lies an effect that ensures the improved durability of the rubber elastic body.

With the vibration control bush of a fifth aspect, in addition to the effect provided by the vibration control bush of the fourth aspect, the following effect is provided. The curvature radii of the first curved surface and the second curved surface are each set approximately identical. This ensures reducing the stress to concentrate biased on any of the first curved surface and the second curved surface when the load in the axis-perpendicular direction is input on the inner pipe (the outer pipe). Accordingly, there lies an effect that ensures the improved durability of the rubber elastic body.

With the vibration control bush of a sixth aspect, in addition to the effect provided by the vibration control bush of the fourth aspect, the following effect is provided. Since the curvature radius of the first curved surface is set smaller than the curvature radius of the second curved surface, the inner pipe film portion can be formed to be thin walled in the region (the region in the center side in the axial direction of the inner pipe film portion) where the flow of the rubber is relatively inhibited easily. This yields an effect that ensures reducing the rubber elastic body to deform so as to bend (close contact) between the inner pipe film portion and the outer pipe film portion when the load in the wrenching direction is input.

With the vibration control bush of a seventh aspect, in addition to the effect provided by the vibration control bush of the fourth aspect, the following effect is provided. The dimension in the axis-perpendicular direction from the connection position of the first curved surface and the straight line surface to the connection position of the second curved surface and the straight line surface is set to a quarter or more and less than three quarters of the curvature radii of the first curved surface and the second curved surface. This ensures inhibiting the curvature radii of the first curved surface and the second curved surface from excessively increasing and excessively decreasing. Accordingly, there lies an effect that ensures reducing the stress to concentrate on the first curved surface and the second curved surface when the load in the wrenching direction and the axis O perpendicular direction is input, while reducing the inner pipe film portion and the outer pipe film portion to get thick.

BRIEF DESCRIPTION OF DRAWINGS

FIGS. 2A and 2B FIG. 2A is a partially enlarged cross-sectional view of the vibration control bush that enlarges a part IIa in FIG. 1.

FIGS. 3A and 3B FIG. 3A is a partially enlarged cross-sectional view of a conventional vibration control bush that has an inner diameter of an outer pipe set constant along an axial direction.

DESCRIPTION OF EMBODIMENTS

Figure 1:
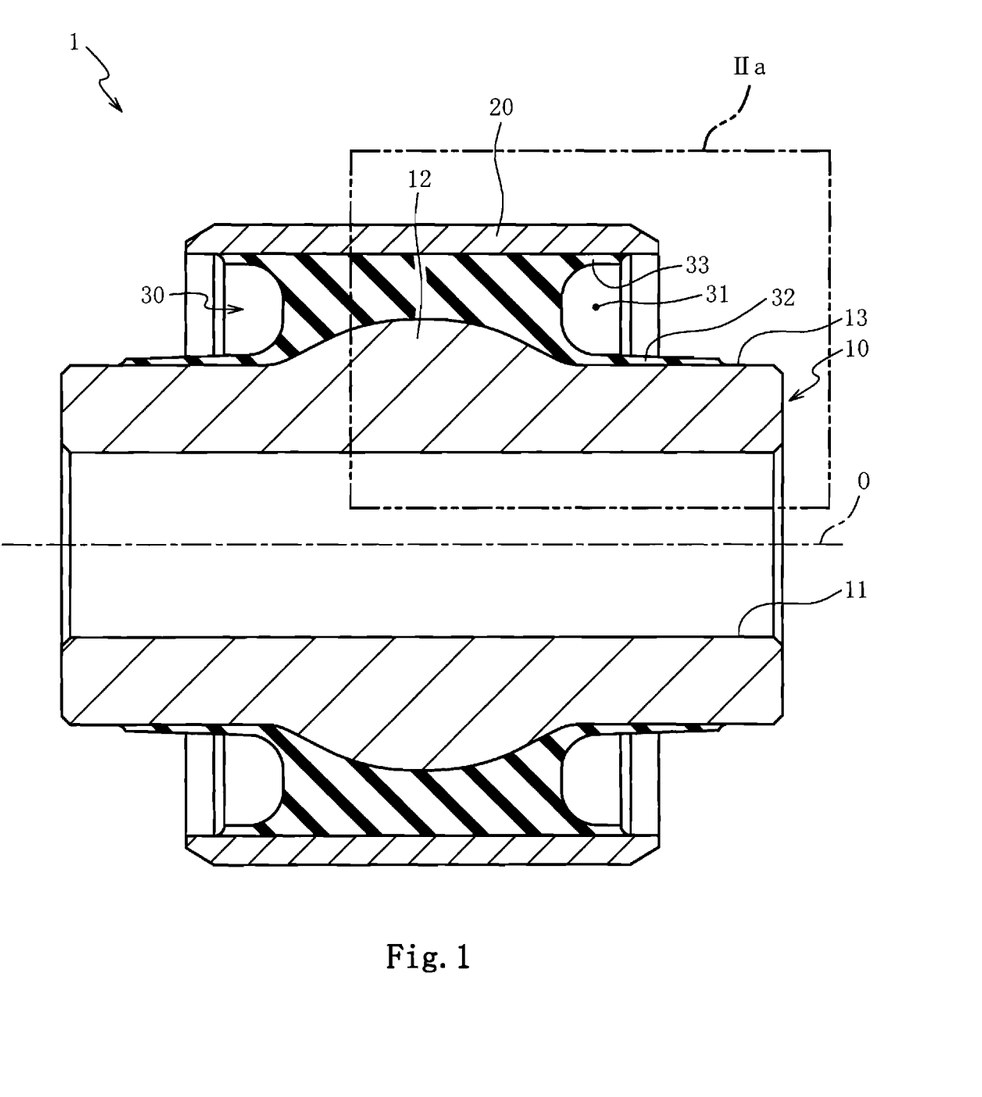
FIG. 1 is a cross-sectional view of a vibration control bush in one embodiment of the present invention.

The following describes a preferred embodiment of the present invention with reference to the attached drawings. First, with reference to FIG. 1, an overall configuration of a vibration control bush 1 will be described. FIG. 1 is a cross-sectional view of the vibration control bush 1 in one embodiment of the present invention. FIG. 1 illustrates a cross-sectional surface cut off on a plane having an axis O of the vibration control bush 1.

As illustrated in FIG. 1, the vibration control bush 1 is, for example, a vibration isolator that elastically joins an arm (not illustrated) used in a suspension mechanism of an automobile and a bracket (not illustrated) installed on a vehicle body. The vibration control bush 1 includes a cylindrically-shaped inner pipe 10, a cylindrically-shaped outer pipe 20 arranged outward in an axis O perpendicular direction (vertical direction in FIG. 1) of the inner pipe 10, and a rubber elastic body 30 that joins the outer pipe 20 and the inner pipe 10. The inner pipe 10, the outer pipe 20, and the rubber elastic body 30 each have the shared axis O (are coaxially disposed), and formed in a shape of rotation symmetry about the axis O.

The inner pipe 10 is a metallic member having a through-hole 11 that passes through along the axis O direction (lateral direction in FIG. 1) and a protruding portion 12 protruding in the direction perpendicular to the axis O from a center in the axis O direction of the inner pipe 10. The through-hole 11 is a portion through which a bolt (not illustrated) for securing the inner pipe 10 to the bracket (not illustrated) is inserted. In the following description, the direction perpendicular to the axis O is simply described as the "axis O perpendicular direction."

The protruding portion 12 is formed into a sphere shape bulging outward in the axis O perpendicular direction from an outer peripheral surface 13 of the inner pipe 10. In other words, an outer peripheral surface of the protruding portion 12 has a diameter formed into an arc shape gradually decreasing as approaching to a side of an end portion in the axis O direction from a center in the axis O direction in the cross-sectional view cut off on the plane having the axis O. The arc-shaped protruding portion 12 is continuously formed along a whole circumference of the inner pipe 10 in a circumferential direction.

In the inner pipe 10, portions on both end sides in the axis O direction with respect to the protruding portion 12 have a diameter (outer diameter) formed into a constant cylindrical shape along the axis O direction. Accordingly, the outer peripheral surface 13 of the inner pipe 10 in the end portion sides in the axis O direction with respect to the protruding portion 12 (region without the protruding portion 12) is formed linearly along the axis O direction in the cross-sectional view cut off on the plane having the axis O.

The outer pipe 20 is a metallic member press-fitted to the arm (not illustrated). The outer pipe 20 has an inner diameter set larger than an outer diameter (maximum outer diameter of the protruding portion 12) of the inner pipe 10. The outer pipe 20 has a dimension in the axis O direction set smaller than a dimension in the axis O direction of the inner pipe 10. The outer pipe 20 has an inner diameter (plate thickness) set constant along the axis O direction.

The rubber elastic body 30 is vulcanization-bonded on the outer peripheral surface of the inner pipe 10 and the inner peripheral surface of the outer pipe 20. More specifically, in the inner pipe 10, the rubber elastic body 30 is vulcanization-bonded on a whole region excluding a part of both the end sides in the axis O direction of the outer peripheral surface 13 of the inner pipe 10. In the outer pipe 20, the rubber elastic body 30 is vulcanization-bonded on a whole region excluding a part of both the end sides in the axis O direction of the inner peripheral surface of the outer pipe 20. The rubber elastic body 30 is continuously vulcanization-bonded onto the outer peripheral surface of the inner pipe 10 and the inner peripheral surface of the outer pipe 20 across the whole circumference in a circumferential direction.

The rubber elastic body 30 includes a recessed portion 31 formed on an end surface in the axis O direction, and recessed toward a center side in the axis O direction. The recessed portion 31 is continuously formed across the whole circumference in the circumferential direction of the rubber elastic body 30. Forming the recessed portions 31 on the rubber elastic body 30 forms thin walled inner pipe film portions 32 and outer pipe film portions 33 on both the end portions in the axis O direction of the rubber elastic body 30.

The inner pipe film portion 32 is a rubber film (a part of the rubber elastic body 30) that coats the outer peripheral surface 13 of the inner pipe 10 between the recessed portion 31 and the inner pipe 10. The outer pipe film portion 33 is a rubber film (a part of the rubber elastic body 30) that coats the inner peripheral surface on the end portion side in the axis O direction of the outer pipe 20 between the recessed portion 31 and the outer pipe 20.

Figure 2A:
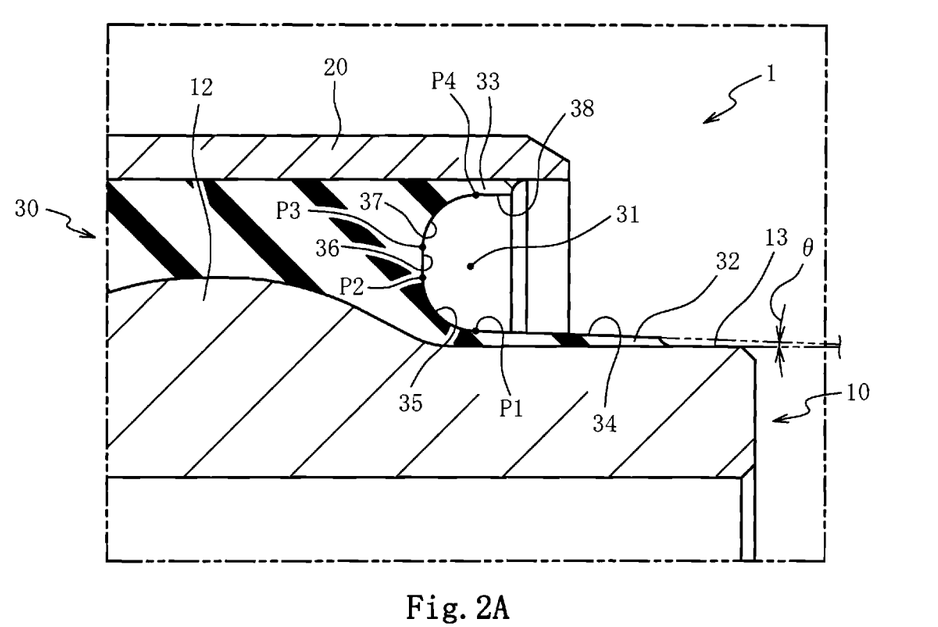
Figure 2B:
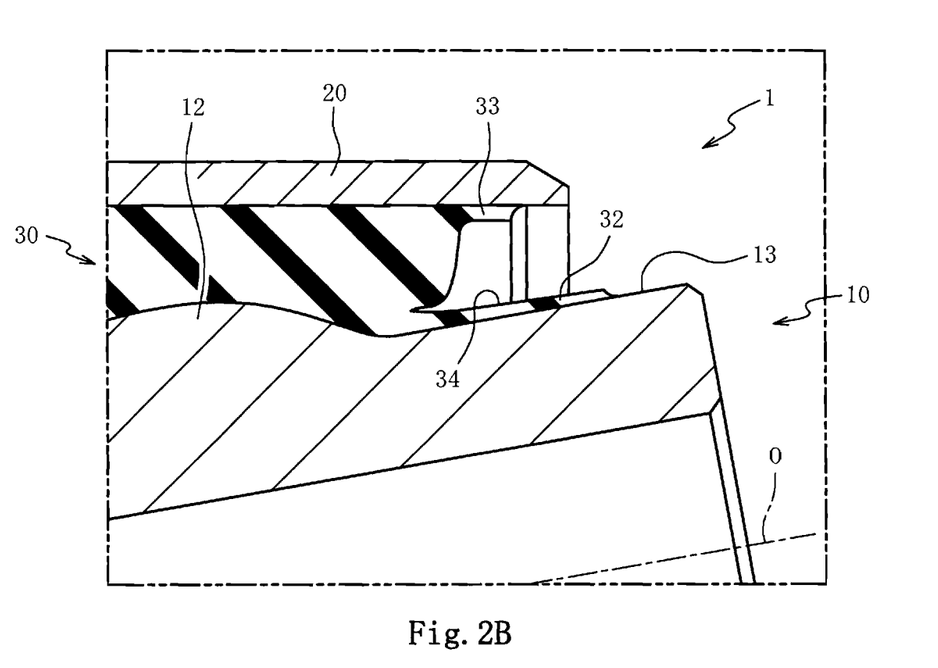
FIG. 2B is a partially enlarged cross-sectional view of the vibration control bush that illustrates a state where a load in a wrenching direction is input from a state of FIG. 2A.

Next, with reference to FIGS. 2A and 2B, a description will be given of a detailed configuration of the vibration control bush 1 and when the load in the wrenching direction is input on the vibration control bush 1. FIG. 2A is a partially enlarged cross-sectional view of the vibration control bush 1 that enlarges a part IIa in FIG. 1, and FIG. 2B is a partially enlarged cross-sectional view of the vibration control bush 1 that illustrates a state where the load in the wrenching direction is input from the state of FIG. 2A. FIGS. 2A and 2B illustrate cross-sectional surfaces that are cut off on a plane having the axis O of the vibration control bush 1.

As illustrated in FIG. 2A, the rubber elastic body 30 of the vibration control bush 1 includes a linear inclined surface 34, an arc-shaped first curved surface 35, a linear first straight line surface 36, an arc-shaped second curved surface 37, and a second straight line surface 38 in the cross-sectional view cut off on the plane having the axis O. The inclined surface 34 inclines with respect to the axis O direction (lateral direction in FIG. 2A). The first curved surface 35 is provided consecutively with the inclined surface 34 and recessed toward the center side in the axis O direction of the inner pipe 10. The first straight line surface 36 is provided consecutively with the first curved surface 35 and runs along the axis O perpendicular direction (vertical direction in FIG. 2A). The second curved surface 37 is provided consecutively with the first straight line surface 36 and recessed toward the center side of the inner peripheral surface in the axis O direction of the outer pipe 20. The second straight line surface 38 is provided consecutively with the second curved surface 37 and formed linearly along the axis O direction.

The inclined surface 34 configures an outer peripheral surface on an end portion side in the axis O direction of the inner pipe film portion 32, and the first curved surface 35 configures an outer peripheral surface on the center side in the axis O direction of the inner pipe film portion 32. The second curved surface 37 configures an inner peripheral surface on a center side in the axis O direction of the outer pipe film portion 33, and the second straight line surface 38 configures an inner peripheral surface on an end portion side in the axis O direction of the outer pipe film portion 33. The first straight line surface 36 is a surface that couples end portions on the center side in the axis O direction of the inner pipe film portion 32 and the outer pipe film portion 33.

The inclined surface 34 is formed to incline at a predetermined inclination angle θ (two degrees in this embodiment) with respect to the axis O direction. An inclination of this inclined surface 34 forms the inner pipe film portion 32 into a taper shape that gradually increases its thickness dimension (dimension in axis O perpendicular direction) from the end portion in the axis O direction to the center side in the axis O direction. This taper shaped inner pipe film portion 32 ensures a draft angle from a mold when the rubber elastic body 30 is vulcanization-molded.

The inclination angle θ of the inclined surface 34 is set to a value as small as possible (in this embodiment, two degrees) to the extent that can ensure the draft angle when the rubber elastic body 30 (the inner pipe film portion 32) is vulcanization-molded. The inner pipe film portion 32 has a thickness dimension (in this embodiment, 0.5 mm) of the end portion in the axis O direction set to a quarter or less of a dimension (in this embodiment, 2.5 mm) in the axis O perpendicular direction from the outer peripheral surface 13 of the inner pipe 10 to an apex of the protruding portion 12.

This ensures forming the inner pipe film portion 32 as thin walled as possible from the end portion in the axis O direction to the center side in the axis O direction while ensuring the draft angle when the rubber elastic body 30 (the inner pipe film portion 32) is vulcanization-molded. A connection position P1 (that is, end portion on center side in axis O direction of the inclined surface 34) of the inclined surface 34 and the first curved surface 35 is positioned on the center side in the axis O direction with respect to the end portion in the axis O direction of the outer pipe film portion 33, therefore, the inner pipe film portion 32 formed to be thin walled can be disposed on the center side in the axis O direction with respect to the end portion in the axis O direction of the outer pipe film portion 33. This ensures obtaining an effect to reduce a stress to concentrate on a part of the rubber elastic body 30 when the load in the wrenching direction is input. This effect will be described with reference to FIG. 2B.

As illustrated in FIG. 2B, when the load in the wrenching direction is input on the inner pipe 10 (the outer pipe 20), a facing interval between the end portions in the axis O direction of the inner pipe 10 and the outer pipe 20 is decreased, and thus, the rubber elastic body 30 positioned between the inner pipe 10 and the outer pipe 20 is compressively deformed. In contrast to this, in this embodiment, as described above, the thickness dimension of the end portion in the axis O direction of the inner pipe film portion 32 is set to a quarter or less of a dimension in the axis O perpendicular direction from the outer peripheral surface 13 of the inner pipe 10 to the apex of the protruding portion 12. The inclination angle θ with respect to the axis O direction of the inclined surface 34 is set to the value (in this embodiment, two degrees) as small as possible to the extent that can ensure the draft angle. This forms the inner pipe film portion 32 to be thin walled from the end portion in the axis O direction to the center side in the axis O direction.

Since the thin walled inner pipe film portion 32 is positioned in the center side in the axis O direction with respect to the end portion in the axis O direction of the outer pipe film portion 33, it is possible to reduce the rubber elastic body 30 to deform so as to bend (close contact) between the inner pipe film portion 32 and the outer pipe film portion 33 when the load in the wrenching direction is input.

In other words, even when the inner diameter of the outer pipe 20 is set constant in the axis O direction and the protruding portion 12 that protrudes outward in the axis O perpendicular direction is formed on the center in the axis O direction of the inner pipe 10 (that is, inner peripheral surface of the outer pipe 20 and the protruding portion 12 inhibit flow of rubber to center side in axis O direction when load in wrenching direction is input), it is possible to reduce a stress to concentrate on a part of the rubber elastic body 30 between the inner pipe film portion 32 and the outer pipe film portion 33 when the load in the wrenching direction is input. Accordingly, the outer pipe 20 with a constant plate thickness is employed, and thus, durability of the rubber elastic body 30 can be improved while reducing a product cost of the vibration control bush 1.

The first curved surface 35 (see FIG. 2A) that configures the outer peripheral surface of the center side in the axis O direction of the inner pipe film portion 32 is coupled with the second curved surface 37 that configures the inner peripheral surface in the center side in the axis O direction of the outer pipe film portion 33 by the first straight line surface 36. The first straight line surface 36 is formed linearly along the axis O perpendicular direction in the cross-sectional view cut off on the plane having the axis O.

This ensures decreasing dimensions in the axis O perpendicular direction of the first curved surface 35 and the second curved surface 37 by the dimension (in this embodiment, 1.1 mm) in the axis O perpendicular direction of the first straight line surface 36. Accordingly, curvature radii of the first curved surface 35 and the second curved surface 37 can be decreased, and thus, the inner pipe film portion 32 positioned between the first curved surface 35 and the inner pipe 10 and the outer pipe film portion 33 positioned between the second curved surface 37 and the outer pipe 20 can be formed to be thin walled. Therefore, when the load in the wrenching direction is input on the inner pipe 10 (the outer pipe 20), it is possible to further effectively reduce the rubber elastic body 30 to deform so as to bend (close contact) between the inner pipe film portion 32 and the outer pipe film portion 33.

A dimension in the axis O perpendicular direction from the outer peripheral surface 13 of the inner pipe 10 to a connection position P2 of the first curved surface 35 and the first straight line surface 36 is set identical to the dimension in the axis O perpendicular direction from the outer peripheral surface 13 of the inner pipe 10 to the apex of the protruding portion 12. This can position the first curved surface 35 inside in the axis O perpendicular direction with respect to the apex of the protruding portion 12.

That is, positioning the first curved surface 35 with the curvature radius decreased by forming the first straight line surface 36 inside in the axis O perpendicular direction with respect to the apex of the protruding portion 12 can form the inner pipe film portion 32 positioned between the first curved surface 35 and the inner pipe 10 to be thin walled in a region inside in the axis O perpendicular direction with respect to the apex of the protruding portion 12 (region where flow of rubber is easily inhibited by existence of the protruding portion 12). Accordingly, when the load in the wrenching direction is input in the inner pipe 10 (the outer pipe 20), it is possible to further effectively reduce the rubber elastic body 30 to deform so as to bend (close contact) between the inner pipe film portion 32 and the outer pipe film portion 33.

If it is possible to reduce the rubber elastic body 30 to deform so as to bend (close contact) between the inner pipe film portion 32 and the outer pipe film portion 33, it is possible to reduce the stress from concentrating on the bent portion to cause a crack. Accordingly, the durability of the rubber elastic body 30 can be improved.

Thus, in order to form the center side portions in the axis O direction of the inner pipe film portion 32 and the outer pipe film portion 33 to be thin walled, the curvature radii of the first curved surface 35 and the second curved surface 37 are simply set small. However, excessively decreasing the curvature radii of the first curved surface 35 and the second curved surface 37 easily causes the stress to concentrate on the first curved surface 35 and the second curved surface 37 when the load in the wrenching direction and the axis O perpendicular direction is input.

In contrast to this, in this embodiment, the dimension in the axis O perpendicular direction from the outer peripheral surface 13 of the inner pipe 10 to the connection position P2 of the first curved surface 35 and the first straight line surface 36 is set to a half or more of the dimension in the axis O perpendicular direction from the outer peripheral surface 13 of the inner pipe 10 to the apex of the protruding portion 12. This ensures inhibiting the dimension of the first curved surface 35 in the axis O perpendicular direction from excessively decreasing, thereby ensuring inhibiting the curvature radius of the first curved surface 35 from excessively decreasing. Accordingly, when the load in the wrenching direction and the axis O perpendicular direction is input on the inner pipe 10 (the outer pipe 20), it is possible to reduce the stress to concentrate on the first curved surface 35.

A dimension in the axis O perpendicular direction from the connection position P2 of the first curved surface 35 and the first straight line surface 36 to a connection position P3 of the first straight line surface 36 and the second curved surface 37 (that is, dimension in axis O perpendicular direction of the first straight line surface 36. In this embodiment, 1.1 mm) is set smaller than the curvature radii (in this embodiment, 2.0 mm) of the first curved surface 35 and the second curved surface 37. This ensures inhibiting the curvature radii of the first curved surface 35 and the second curved surface 37 from excessively decreasing. Accordingly, when the load in the wrenching direction and the axis O perpendicular direction is input on the inner pipe 10 (the outer pipe 20), it is possible to reduce the stress to concentrate on the first curved surface 35 and the second curved surface 37.

Reducing the stress to concentrate on the first curved surface 35 and the second curved surface 37 ensures reducing a crack generation on these first curved surface 35 and second curved surface 37. Accordingly, the durability of the rubber elastic body 30 can be improved.

Here, it is also possible to employ a configuration that set the curvature radius of the first curved surface 35 and the curvature radius of the second curved surface 37 to respective different values. However, in such a configuration, the stress easily concentrates biased on to any of the first curved surface 35 or the second curved surface 37 when the load in the axis O perpendicular direction is input, therefore, a crack may be generated on the first curved surface 35 or the second curved surface 37.

In contrast to this, in this embodiment, the connection position P1 of the inclined surface 34 and the first curved surface 35 and a connection position P4 of the second curved surface 37 and the second straight line surface 38 are arranged aligning in the axis O perpendicular direction, and the curvature radii of the first curved surface 35 and the second curved surface 37 are each set approximately identical. This ensures reducing the stress to concentrate biased on to any of the first curved surface 35 or the second curved surface 37 when the load in the axis O perpendicular direction is input on the inner pipe 10 (the outer pipe 20). Accordingly, the crack generation can be reduced on the first curved surface 35 and the second curved surface 37, thereby ensuring the improved durability of the rubber elastic body 30.

"Approximately identical" has a gist of permitting variations of manufacturing process, material, and measurement. Specifically, "approximately identical" is within a range of ±10%. Accordingly, for example, if the curvature radius of the second curved surface 37 is within a range of 1.8 mm or more and 2.2 mm or less when the curvature radius of the first curved surface 35 is 2.0 mm, they are approximately identical curvature radii.

The second straight line surface 38 configuring the outer peripheral surface on the end portion side in the axis O direction of the outer pipe film portion 33 is formed linearly along the axis O direction in the cross-sectional view cut off on the plane having the axis O as described above. This is because the outer pipe 20 is subject to a diameter reduction process after the rubber elastic body 30 is vulcanization-molded.

That is, in a state before the diameter reduction process of the outer pipe 20, similarly to the inclined surface 34, the second straight line surface 38 is formed to incline at a predetermined inclination angle (one degree or more and less than three degrees) with respect to the axis O direction. This inclination ensures the draft angle after the vulcanization molding of the rubber elastic body 30.

After the rubber elastic body 30 is vulcanization-molded, the diameter of the outer pipe 20 is entirely reduced, and thus, a precompression in the axis O perpendicular direction is applied to the rubber elastic body 30. At this time, in accordance with the diameter reduction process of the outer pipe 20, the outer pipe film portion 33 deforms inward in the axis O perpendicular direction, and therefore, the second straight line surface 38 is formed linearly along the axis O direction in the product state.

In other words, forming the second straight line surface 38 linearly along the axis O direction ensures setting the inclination angle of the second straight line surface 38 after the vulcanization molding of the rubber elastic body 30 (before diameter reduction process of the outer pipe 20) to as small as possible to the extent that can ensure the draft angle of the outer pipe film portion 33. This ensures forming the outer pipe film portion 33 to be thin walled from the end portion in the axis O direction to the center side in the axis O direction in a region where the second straight line surface 38 is formed. Accordingly, it is possible to reduce the rubber elastic body 30 to deform so as to bend (close contact) between the inner pipe film portion 32 and the outer pipe film portion 33 when the load in the wrenching direction is input. Therefore, the durability of the rubber elastic body 30 can be improved.

As described above, the present invention has been described based on the embodiment. It will be easily appreciated that the present invention will not be limited to the embodiment described above, but various modifications are possible without departing from the technical scope of the present invention. For example, dimensions of the respective portions, the inner pipe 10, the outer pipe 20, and the rubber elastic body 30 are examples, and can be set as necessary.

Accordingly, for example, while the above-described embodiment has described the case where the thickness dimension of the end portion in the axis O direction of the inner pipe film portion 32 is 0.5 mm, the configuration is not necessarily limited to this. For example, it is preferred to set the thickness dimension of the end portion in the axis O direction of the inner pipe film portion 32 to 0.3 mm or more and less than 0.7 mm. This ensures forming the inner pipe film portion 32 to be thin walled.

While the above-described embodiment has described the case where the vibration control bush 1 is incorporated in the suspension mechanism of the automobile, the configuration is not necessarily limited to this. The configuration may incorporate the vibration control bush 1 in another mechanism. The other mechanism can include, for example, a torque rod of an engine mount.

While the above-described embodiment has described the case where the inner pipe 10 and the outer pipe 20 are metallic, the configuration is not necessarily limited to this. The configuration may have any or all of the inner pipe 10 and the outer pipe 20 to be made of synthetic resin.

While the above-described embodiment has described the inner pipe 10 and the outer pipe 20 that are formed to be integral, the configuration is not necessarily limited to this. The inner pipe 10 and the outer pipe 20 may be each divided into a plurality of members to form the inner pipe 10 and the outer pipe 20 by butting (connecting) the plurality of members together.

The above-described embodiment has omitted an exemplary specific numerical value of the thickness dimension of the outer pipe film portion 33. The thickness dimension of the outer pipe film portion 33 is preferred to be set to a quarter or less (for example, 0.3 mm or more and less than 0.7 mm) of the dimension in the axis O perpendicular direction from the outer peripheral surface 13 of the inner pipe 10 to the apex of the protruding portion 12. This ensures forming the outer pipe film portion 33 to be thin walled.

While the above-described embodiment has described the case where the inclination angle of the inclined surface 34 is two degrees, the configuration is not necessarily limited to this. The inclination angle of the inclined surface 34 is preferred to be set to one degree or more and less than three degrees. This ensures forming the inner pipe film portion 32 to be thin walled while ensuring the draft angle of the rubber elastic body 30 (the inner pipe film portion 32).

While the above-described embodiment has described the case where the first curved surface 35 and the second curved surface 37 are formed into an arc shape in the cross-sectional view cut off on the plane having the axis O, the configuration is not necessarily limited to this. For example, the first curved surface 35 and the second curved surface 37 may be formed by a plurality of arc surfaces and a surface made by combining a straight line and a curved line in the cross-sectional view cut off on the plane having the axis O.

While the above-described embodiment has described the case where the curvature radii of the first curved surface 35 and the second curved surface 37 are each set approximately identical, the configuration is not necessarily limited to this. For example, the curvature radii of the first curved surface 35 and the second curved surface 37 may be set to respective different values. In this case, it is preferred to set the curvature radius of the first curved surface 35 smaller than that of the second curved surface 37.

That is, when the load in the wrenching direction is input, the region (region in which the first curved surface 35 is formed) on the center side in the axis O direction of the inner pipe film portion 32 has the flow of the rubber to the center side in the axis O direction easily inhibited by the protruding portion 12 compared with the region (region in which the second curved surface 37 is formed) on the center side in the axis O direction of the outer pipe film portion 33.

In contrast to this, setting the curvature radius of the first curved surface 35 smaller than that of the second curved surface 37 ensures forming the inner pipe film portion 32 to be thin walled in the region (region on center side in axis O direction of the inner pipe film portion 32) where the flow of the rubber is relatively inhibited easily. This ensures reducing the rubber elastic body 30 to deform so as to bend (close contact) between the inner pipe film portion 32 and the outer pipe film portion 33 when the load in the wrenching direction is input.

While the above-described embodiment has described the case where the dimension in the axis O perpendicular direction from the outer peripheral surface 13 of the inner pipe 10 to the connection position P2 of the first curved surface 35 and the first straight line surface 36 is set identical to the dimension in the axis O perpendicular direction from the outer peripheral surface 13 of the inner pipe 10 to the apex of the protruding portion 12, the configuration is not necessarily limited to this. For example, the dimension in the axis O perpendicular direction from the outer peripheral surface 13 of the inner pipe 10 to the connection position P2 of the first curved surface 35 and the first straight line surface 36 may be configured to be set smaller than the dimension in the axis O perpendicular direction from the outer peripheral surface 13 of the inner pipe 10 to the apex of the protruding portion 12.

This ensures forming the center side portion (region in which the first curved surface 35 is formed) in the axis O direction of the inner pipe film portion 32 to be thin walled in the region on the axis O side with respect to the apex of the protruding portion 12. Accordingly, it is possible to reduce the rubber elastic body 30 to deform so as to bend (close contact) between the inner pipe film portion 32 and the outer pipe film portion 33 when the load in the wrenching direction is input.

While the above-described embodiment has described the case where the dimension in the axis O perpendicular direction of the first straight line surface 36 is set smaller than the curvature radii of the first curved surface 35 and the second curved surface 37, the configuration is not necessarily limited to this. For example, the dimension in the axis O perpendicular direction of the first straight line surface 36 may be configured to be set identical to or larger than the curvature radius of the first curved surface 35 or the second curved surface 37.

When the dimension in the axis O perpendicular direction of the first straight line surface 36 is set smaller than the curvature radii of the first curved surface 35 and the second curved surface 37, the dimension in the axis O perpendicular direction of the first straight line surface 36 is preferred to be set to a quarter or more and less than three quarters of the curvature radii of the first curved surface 35 and the second curved surface 37. This ensures inhibiting the curvature radii of the first curved surface 35 and the second curved surface 37 from excessively decreasing (stress from concentrating on the first curved surface 35 and the second curved surface 37 when the load in the wrenching direction and the axis O perpendicular direction is input) while inhibiting the curvature radii of the first curved surface 35 and the second curved surface 37 from increasing (the inner pipe film portion 32 and the outer pipe film portion 33 from thickening).

While the above-described embodiment has described the case where the second straight line surface 38 is formed linearly along the axis O direction in the cross-sectional view cut off the plane having the axis O, the configuration is not necessarily limited to this. For example, the configuration may have the second straight line surface 38 inclined with respect to the axis O direction and the thickness dimension of the outer pipe film portion 33 increased as approaching the center side in the axis O direction.

The invention claimed is:

1. A vibration control bush comprising:
an inner pipe that has a spherical protruding portion that protrudes outward in an axis-perpendicular direction and is formed continuously in a circumferential direction on a center side in an axial direction;
a cylindrically-shaped outer pipe disposed in an outside in the axis-perpendicular direction of the inner pipe, the outer pipe having an inner diameter set constant along the axial direction;
a rubber elastic body that joins an inner peripheral surface of the outer pipe and an outer peripheral surface of the inner pipe; and
a recessed portion recessed toward a center in the axial direction from an end surface in the axial direction of the rubber elastic body, wherein
the rubber elastic body includes an inner pipe film portion and an outer pipe film portion, the inner pipe film portion coating the outer peripheral surface of the inner pipe between the recessed portion and the inner pipe, the outer pipe film portion coating the inner peripheral surface of the outer pipe between the recessed portion and the outer pipe,
the vibration control bush has a thickness dimension of the inner pipe film portion set to gradually increase from an end portion in the axial direction to the center side in the axial direction,
the rubber elastic body has a linear inclined surface, a first curved surface, a linear straight line surface, and a second curved surface in a cross-sectional view cut off on a plane having an axis, the inclined surface configuring an outer peripheral surface on an end portion side in the axial direction of the inner pipe film portion and inclining with respect to the axial direction, the first curved surface being continuous with the inclined surface to configure an outer peripheral surface on a center side in the axial direction of the inner pipe film portion and being recessed toward the center side of the inner pipe in the axial direction, the straight line surface being continuous with the first curved surface and running along the axis-perpendicular direction, the second curved surface being continuous with the straight line surface to configure an inner peripheral surface on a center side in the axial direction of the outer pipe film portion and being recessed toward the center side of the inner peripheral surface of the outer pipe in the axial direction,
the inner pipe film portion has an end portion in the axial direction whose thickness dimension is set to a quarter or less of a dimension in the axis-perpendicular direction from the outer peripheral surface of the inner pipe to an apex of the protruding portion,
the inclined surface has an inclination angle with respect to the axial direction that is set to one degree or more and less than three degrees,
a boundary of the inclined surface and the first curved surface is positioned on the center side in the axial direction with respect to the end portion in the axial direction of the outer pipe film portion, and
a dimension in the axis-perpendicular direction from the outer peripheral surface of the inner pipe to a boundary of the first curved surface and the straight line surface is set to less than or equal to a dimension in the axis-perpendicular direction from the outer peripheral surface of the inner pipe to the apex of the protruding portion.

2. The vibration control bush according to claim 1, wherein
the dimension in the axis-perpendicular direction from the outer peripheral surface of the inner pipe to the boundary of the first curved surface and the straight line surface is set to a half or more of the dimension in the axis-perpendicular direction from the outer peripheral surface of the inner pipe to the apex of the protruding portion.

3. The vibration control bush according to claim 1, wherein
the first curved surface and the second curved surface are formed into respective arc shapes in the cross-sectional view cut off on the plane having the axis, and
a dimension in the axis-perpendicular direction from the boundary of the first curved surface and the straight line surface to a boundary of the second curved surface and the straight line surface is set smaller than curvature radii of the first curved surface and the second curved surface.

4. The vibration control bush according to claim 3, wherein
the curvature radii of the first curved surface and the second curved surface are each set approximately identical.

5. The vibration control bush according to claim 3, wherein
the curvature radius of the first curved surface is set smaller than the curvature radius of the second curved surface.

6. The vibration control bush according to claim 3, wherein
the dimension in the axis-perpendicular direction from the boundary of the first curved surface and the straight line surface to the boundary of the second curved surface and the straight line surface is set to a quarter or more and less than three quarters of the curvature radii of the first curved surface and the second curved surface.

* * * * *